US007926098B2

(12) United States Patent
Chinitz et al.

(10) Patent No.: US 7,926,098 B2

(45) Date of Patent: Apr. 12, 2011

(54) HANDOFF OF A SECURE CONNECTION AMONG GATEWAYS

(75) Inventors: Leigh M. Chinitz, Wellesley, MA (US); Minsh Den, Nashua, NH (US)

(73) Assignee: Airvana, Corp., Chelmsford, MA (US)

( * ) Notice: Subject to any disclaimer, the term of this patent is extended or adjusted under 35 U.S.C. 154(b) by 1077 days.

(21) Appl. No.: 11/618,106

(22) Filed: Dec. 29, 2006

(65) Prior Publication Data

US 2008/0162924 A1 Jul. 3, 2008

(51) Int. Cl.

*G06F 9/00* (2006.01)
*G06F 17/00* (2006.01)
*H04W 4/00* (2009.01)

(52) U.S. Cl. ........... 726/12; 726/2; 713/154; 455/422.1; 455/436

(58) Field of Classification Search ................ 726/2, 12; 713/154; 455/422.1, 436

See application file for complete search history.

(56) References Cited

U.S. PATENT DOCUMENTS

| | | | | |
|---|---|---|---|---|
| 6,711,144 | B1 | 3/2004 | Kim et al. | |
| 6,731,618 | B1 | 5/2004 | Chung et al. | |
| 6,741,862 | B2 | 5/2004 | Chung et al. | |
| 6,775,533 | B2 * | 8/2004 | Kakani et al. | 455/403 |
| 6,781,999 | B2 | 8/2004 | Eyuboglu et al. | |
| 6,876,747 | B1 * | 4/2005 | Faccin et al. | 380/247 |
| 7,046,647 | B2 * | 5/2006 | Oba et al. | 370/331 |
| 7,170,871 | B2 | 1/2007 | Eyuboglu et al. | |
| 7,200,391 | B2 | 4/2007 | Chung et al. | |
| 7,242,958 | B2 | 7/2007 | Chung et al. | |
| 7,277,446 | B1 | 10/2007 | Abi-Nassif et al. | |
| 7,299,278 | B2 | 11/2007 | Ch'ng | |
| 7,515,643 | B2 | 4/2009 | Chung | |
| 7,558,356 | B2 | 7/2009 | Pollman et al. | |
| 7,558,588 | B2 | 7/2009 | To et al. | |
| 7,603,127 | B2 | 10/2009 | Chung et al. | |
| 7,626,926 | B2 | 12/2009 | Abi-Nassif et al. | |
| 7,656,835 | B2 * | 2/2010 | Joutsenvirta et al. | 370/328 |
| 7,672,682 | B2 | 3/2010 | Sharma et al. | |
| 7,729,243 | B2 | 6/2010 | Ananthaiyer et al. | |
| 7,730,189 | B2 | 6/2010 | Harikumar et al. | |
| 7,751,835 | B2 | 7/2010 | Sharma et al. | |
| 7,801,487 | B2 | 9/2010 | Mehrabanzad et al. | |

(Continued)

FOREIGN PATENT DOCUMENTS

| | | |
|---|---|---|
| GB | 2452688 | 3/2009 |

OTHER PUBLICATIONS

Eronen, P., ed., "IKEv2 Mobility and Multihoming Protocol (MOBIKE)", The Internet Society, RFC 4555, Jun. 2006, 30 pgs.

(Continued)

*Primary Examiner* — Kambiz Zand
*Assistant Examiner* — William S Powers
(74) *Attorney, Agent, or Firm* — Fish & Richardson P.C.

(57) ABSTRACT

A method includes establishing a secure connection between a client device and a first security gateway, the first security gateway being associated with a service provider for providing a service to the client device, and handing off the secure connection from the first security gateway to a second security gateway. Handing off the secure connection includes sending from the first security gateway to the second security gateway security information used to encrypt and decrypt messages transmitted through the secure connection, and sending from the first security gateway to the client device an address of the second security gateway to enable the client device to initiate contact with the second security gateway.

49 Claims, 5 Drawing Sheets

100
AT
104a
Security gateway 1
150
104b
Security gateway 2
130
IKE association established
Data traffic flows
132
134
Data traffic stops, session moved into dormant state
136
Active session capacity reached. No more active sessions can be established
140
User attempts to send data
SG_1 sends OUT OF CAPACITY message to SG_2
138
SG_2 responds with CAPACITY_AVAILABLE message
142
SG_1 transfers IKE security association information for AT to SG_2
144
145
Confirm readiness to accept handoff
SG_1 informs AT that the endpoint of the IKE SA is now at SG_2
146
Routing path validation
147
149
Response validating routing path
Handoff success
151
User continues sending data, now to SG_2 rather than SG_1
148

U.S. PATENT DOCUMENTS 7,831,257 B2 11/2010 Pollman et al.
7,835,698 B2 11/2010 Eyuboglu et al.
7,843,892 B2 11/2010 Mehrabanzad et al.
2002/0196749 A1 12/2002 Eyuboglu et al.
2003/0145091 A1* 7/2003 Peng et al. .................... 709/229
2005/0213555 A1 9/2005 Eyuboglu et al.
2005/0245279 A1 11/2005 Mehrabanzad et al.
2006/0111113 A1* 5/2006 Waris ............................ 455/441
2006/0291420 A1 12/2006 Ng
2006/0294241 A1 12/2006 Cherian et al.
2007/0026884 A1 2/2007 Rao
2007/0058628 A1 3/2007 Palnati et al.
2007/0097916 A1 5/2007 Eyuboglu et al.
2007/0140172 A1 6/2007 Garg et al.
2007/0140184 A1 6/2007 Garg et al.
2007/0140185 A1 6/2007 Garg et al.
2007/0140218 A1 6/2007 Nair et al.
2007/0220573 A1 9/2007 Chiussi et al.
2007/0230419 A1 10/2007 Raman et al.
2007/0238442 A1 10/2007 Mate et al.
2007/0242648 A1 10/2007 Garg et al.
2007/0248042 A1 10/2007 Harikumar et al.
2008/0003988 A1 1/2008 Richardson
2008/0013488 A1 1/2008 Garg et al.
2008/0062925 A1 3/2008 Mate et al.
2008/0065752 A1 3/2008 Ch'ng et al.
2008/0069020 A1 3/2008 Richardson
2008/0069028 A1 3/2008 Richardson
2008/0076398 A1 3/2008 Mate et al.
2008/0117842 A1 5/2008 Rao
2008/0119172 A1 5/2008 Rao et al.
2008/0139203 A1 6/2008 Ng et al.
2008/0146232 A1 6/2008 Knisely
2008/0151843 A1 6/2008 Valmikam et al.
2008/0159236 A1 7/2008 Ch'ng et al.
2008/0162924 A1 7/2008 Chinitz et al.
2008/0162926 A1 7/2008 Xiong et al.
2008/0253550 A1 10/2008 Ch'ng et al.
2008/0254792 A1 10/2008 Ch'ng
2009/0034440 A1 2/2009 Samar et al.
2009/0082020 A1 3/2009 Ch'ng et al.
2009/0088155 A1 4/2009 Kim
2009/0116445 A1 5/2009 Samar et al.
2009/0154447 A1 6/2009 Humblet
2009/0156165 A1 6/2009 Raghothaman et al.
2009/0156195 A1 6/2009 Humblet
2009/0156218 A1 6/2009 Garg et al.
2009/0163202 A1 6/2009 Humblet et al.
2009/0163216 A1 6/2009 Hoang et al.
2009/0163238 A1 6/2009 Rao et al.
2009/0164547 A1 6/2009 Ch'ng et al.
2009/0168766 A1 7/2009 Eyuboglu et al.
2009/0168788 A1 7/2009 Den et al.
2009/0170475 A1 7/2009 Ch'Ng et al.
2009/0170520 A1 7/2009 Jones
2009/0170547 A1 7/2009 Raghothaman et al.
2009/0172169 A1 7/2009 Ramaswamy et al.
2009/0172397 A1 7/2009 Kim
2009/0186626 A1 7/2009 Raghothaman et al.
2009/0262697 A1 10/2009 To et al.
2009/0318162 A1 12/2009 Chung et al.
2010/0054219 A1 3/2010 Humblet et al.
2010/0075658 A1 3/2010 Hou et al.
2010/0085910 A1 4/2010 Humblet
2010/0157825 A1 6/2010 Anderlind et al.
2010/0157941 A1 6/2010 Raghothaman et al.
2010/0165957 A1 7/2010 Hegde et al.
2010/0165960 A1 7/2010 Richardson
2010/0167694 A1 7/2010 Chiussi et al.
2010/0167718 A1 7/2010 Chiussi et al.
2010/0167742 A1 7/2010 Rajagopalan et al.
2010/0167771 A1 7/2010 Raghothaman et al.
2010/0167777 A1 7/2010 Raghothaman et al.
2010/0167778 A1 7/2010 Raghothaman et al.
2010/0177731 A1 7/2010 Ananthaiyer et al.
2010/0202362 A1 8/2010 Harikumar et al.
2010/0242103 A1 9/2010 Richardson et al.
2010/0284370 A1 11/2010 Samar et al.
2010/0290389 A1 11/2010 Hou et al.

OTHER PUBLICATIONS

3rd Generation Partnership Project 2 "3GPP2", "cdma2000 High Rate Packet Data Interface Specification", C.S0024, version 4, Oct. 25, 2002 (548 pages).

* cited by examiner

HANDOFF OF A SECURE CONNECTION AMONG GATEWAYS

BACKGROUND

The description relates to handoff of a secure connection among gateways.

A service provider can control access to its services (e.g., phone, e-mail, and Internet services) by using security gateways to authenticate and establish secure connections with access terminals (e.g., mobile phones or computers) that utilize the services. The secure connections can, e.g., prevent eavesdropping and avoid third party attacks to the networks of the service provider. The secure connections can be established using, e.g., Internet Key Exchange (IKE) v2/IPSec protocol.

The security gateway may support active session and dormant session connectivity. In an active session, data packets are transferred between the access terminal and the security gateway. If no data packet has been transferred for a predetermined period of time between the access terminal and the security gateway, the session may be moved to a dormant state. When an access terminal is in the dormant state, resources in the security gateway will not be allocated for this access terminal, freeing those resources for use by other access terminals in an active state.

SUMMARY

In one aspect, in general, a method includes establishing a secure connection between a client device and a first security gateway, the first security gateway being associated with a service provider for providing a service to the client device, and handing off the secure connection from the first security gateway to a second security gateway. Handing off the secure connection includes sending from the first security gateway to the second security gateway security information used to encrypt and decrypt messages transmitted through the secure connection, and sending from the first security gateway to the client device an address of the second security gateway to enable the client device to initiate contact with the second security gateway.

Implementations of the method can include one or more of the following features. The method includes transmitting encrypted messages between the client device and the second security gateway without exchanging security keys between the client device and the second security gateway, the second security gateway encrypting and decrypting messages to and from the client device using the security information obtained from the first security gateway. The method includes, while a communication session between the client device and the first security gateway is in a dormant state, receiving a signal indicating that the session will change from the dormant state to an active state. The method includes, at the first gateway, initiating handoff of the secure connection to the second security gateway after determining that the second security gateway has more resource than the first security gateway to support the communication session in the active state.

The method includes, at the first security gateway, buffering data intended to be sent to the client device, and not sending the buffered data from the first security gateway to the client device. The method includes, upon receiving a message from the second security gateway indicating success of handoff of the secure connection, sending the buffered data from the first security gateway to the second security gateway. The method includes, upon receiving a message from the second security gateway indicating success of handoff of the secure connection, releasing resources of the first security gateway that are associated with the secure connection.

Establishing the secure connection includes using Internet Key Exchange (IKEv2) protocol to establish security associations. The method includes modifying the security associations using IKEv2 Mobility and Multihoming (MOBIKE) protocol. Providing address information about the second security gateway includes using an extension of the IKEv2 MOB IKE protocol by sending to the client device a message indicating that a security association address needs to be updated, and providing the address of the second security gateway in the message. The message includes an INFORMATIONAL request containing an UPDATE_SA_ADDRESSES notification.

Establishing the secure connection includes establishing a secure tunnel in which headers and payloads of packets transmitted in the secure tunnel are encrypted. Providing the address of the second security gateway to the client device includes providing an encrypted version of the address. The method includes, at the second security gateway, receiving a return routability check issued by the client device. The method includes sending from the second security gateway to the first security gateway a message confirming success of handoff of the secure connection. The client device includes a mobile phone. The handing off of the secure connection from the first security gateway to a second security gateway is for load balancing the first and second security gateways.

In another aspect, in general, a method includes establishing security associations between a client device and a first security gateway that is associated with a service provider that provides service to the client device, and receiving, at the client device, a message from the first security gateway indicating that a security association address needs to be updated, the message including an address of a second security gateway. The method includes, at the client device, encrypting and decrypting messages transmitted to and received from the second security gateway without exchanging security keys with the second security gateway, the messages being encrypted or decrypted using security information previously used for encrypting or decrypting messages transmitted to or received from the first security gateway.

Implementations of the method can include one or more of the following features. The method includes allowing a communication session between the client device and the first security gateway to enter a dormant state and later send data from the client device to the first security gateway. The method includes, at the client device, upon receiving the message from the first security gateway, sending a return routability check message to the second security gateway using the address provided by the first security gateway.

In another aspect, in general, a method includes transferring a first end point of a secure tunnel from a first device to a second device by sending a first message from the first device to a third device, the third device located at a second end point of the secure tunnel, the message indicating that a security association address needs to be updated, the message including an address of the second device. The method includes sending a second message from the first device to the second device, the second message including security information used by the first device to encrypt and decrypt messages sent to and received from the third device through the secure tunnel Implementations of the method can include one or more of the following features. The method includes establishing the secure tunnel using the IKEv2 protocol and modifying the secure tunnel using the IKEv2 MOBIKE protocol Sending the first message includes using an extension of the IKEv2

MOBIKE protocol by sending the address of the second device in addition to an INFORMATIONAL request containing an UPDATE_SA_ADDRESSES notification. In some examples, the first device includes a client device, and the third device includes a security gateway associated with a service provider that provides service to the client device. In some examples, the first and third devices each includes a security gateway.

In another aspect, in general, a method includes transferring a first end point of a secure connection among a plurality of gateways, the secure connection having a second end point that is maintained at a client device while the first end point is transferred among the plurality of gateways. Transferring the first end point of the secure connection among the plurality of gateways includes transferring security information among the plurality of gateways, the security information defining parameters of the secure connection.

Implementations of the method can include one or more of the following features. Transferring the first end point of the secure connection among the gateways includes transferring the first end point from a first one of the gateways to a second one of the gateways, and sending from the first gateway to the client device an address of the second gateway to enable the client device to initiate contact with the second gateway. The method includes determining which one of the gateways for accepting the transfer of the first end point of the secure connection to load balance the plurality of gateways.

In another aspect, in general, a system includes a first security gateway configured to establish a secure connection with a client device by exchanging security keys with the client device. The first security gateway is also configured to hand off the secure connection to a second security gateway by sending to the second security gateway security information used to encrypt and decrypt messages transmitted through the secure connection, and sending to the client device the address of the second security gateway to enable the client device to initiate contact with the second security gateway, Implementations of the system can include one or more of the following features. The system includes the second security gateway, wherein the second security gateway encrypts or decrypts messages sent to or received from the client device without exchanging security keys with the client device, the second security gateway encrypting or decrypting the messages sent to or received from the client device using the security information obtained from the first security gateway.

In some examples, the first security gateway is configured to initiate handoff of the secure connection upon determining that the first security gateway does not have enough resources to support the client device. In some examples, the first security gateway is configured to initiate handoff of the secure connection upon (a) receiving a signal indicating that a communication session between the client device and the first security gateway will change from a dormant state to an active state and (b) determining that the first security gateway does not have enough resources to support the client device in the active state. In some examples, the first security gateway is configured, to initiate handoff of the secure connection upon determining that the second security gateway has more resources than the first security gateway to support the client device.

The first security gateway is configured to buffer data intended to be sent to the client device after the start of the handoff of the secure connection, and not send the buffered data from the first security gateway to the client device. The first security gateway is configured to send the buffered data from the first security gateway to the second security gateway upon receiving a message from the second security gateway indicating success of handoff of the secure connection. The first security gateway is configured to release resources of the first security gateway that are associated with the secure connection upon receiving a message from the second security gateway indicating success of handoff of the secure connection.

The first security gateway is configured to establish secure associations with the client device using the IKEv2 protocol. The first security gateway is configured to modify the security associations with the client device using the IKEv2 MOBIKE protocol. The first security gateway is configured to provide the address of the second security gateway to the client device using an extension of the IKEv2 MOBIKE protocol by sending to the client device a message indicating that a security association address needs to be updated, and providing the address of the second security gateway in the message. The secure connection includes a secure tunnel in which headers and payloads of packets transmitted in the tunnel are encrypted. The first security gateway is configured to provide an encrypted version of the address of the second security gateway to the client device. The client device includes a mobile phone.

In another aspect, in general, a system includes a client device configured to establish security associations with a first security gateway by exchanging security keys with the first security gateway, the client device receiving service from a service provider associated with the first security gateway. The client device is configured to recognize a message from the first security gateway indicating that a security association address needs to be updated, the message including an address of a second security gateway. The client device is also configured to send encrypted messages to the second security gateway using the address included in the message, the client device encrypting the messages using security information previously used to encrypt messages sent to the first security gateway.

Implementations of the system can include one or more of the following features. The client device is configured to send a return routability check message to the second security gateway upon receiving the message from the first security gateway. The client device includes a mobile phone. The client device is configured to establish the security associations with the first security gateway using the IKEv2 protocol. The client device is configured to modify the security associations with the first security gateway using the IKEv2 MOBIKE protocol. The message from the first security gateway includes an INFORMATIONAL request containing an UPDATE_SA_ADDRESSES notification.

In another aspect, in general, a system includes a plurality of gateways that are configured to transfer a first end point of a secure connection among the plurality of gateways, the secure connection having a second end point that is maintained at a client device while the first end point is transferred among the plurality of gateways. The plurality of gateways are configured to transfer security information associated with the secure connection from a first one of the plurality of the gateways to a second one of the plurality of gateways when transferring the first end point of the secure connection from the first gateway to the second gateway.

Implementations of the system can include one or more of the following features. The plurality of gateways are configured such that when, transferring the first end point from a first one of the plurality of gateways to a second one of the plurality of gateways, the first gateway sends to the client device an address of the second gateway to enable the client device to initiate contact with the second gateway. The plurality of gateways are configured such that a first one of the gateways establish the secure connection with, the client device by exchanging messages with the client device to establish security associations that define parameters of the secure connection according to IKEv2 protocol. The plurality of gateways are configured to transfer the first end point of the secure connection among the plurality of gateways for load balancing.

Advantages of the systems and methods can include one or more of the following. By enabling handoff of security associations or a secure tunnel from one security gateway to another, resources of a plurality of security gateways can be utilized more efficiently. Load balancing of security gateways can be achieved while maintaining security associations with client devices. When one security gateway determines that it cannot support a session in the active state, the session can be transferred to another security gateway that has sufficient resources. Incidences of dropped data packets can be reduced and user experience can be enhanced. The handoff of the security associations or secure tunnels across security gateways can be achieved using an extension to an existing protocol.

DESCRIPTION

Figure 1:
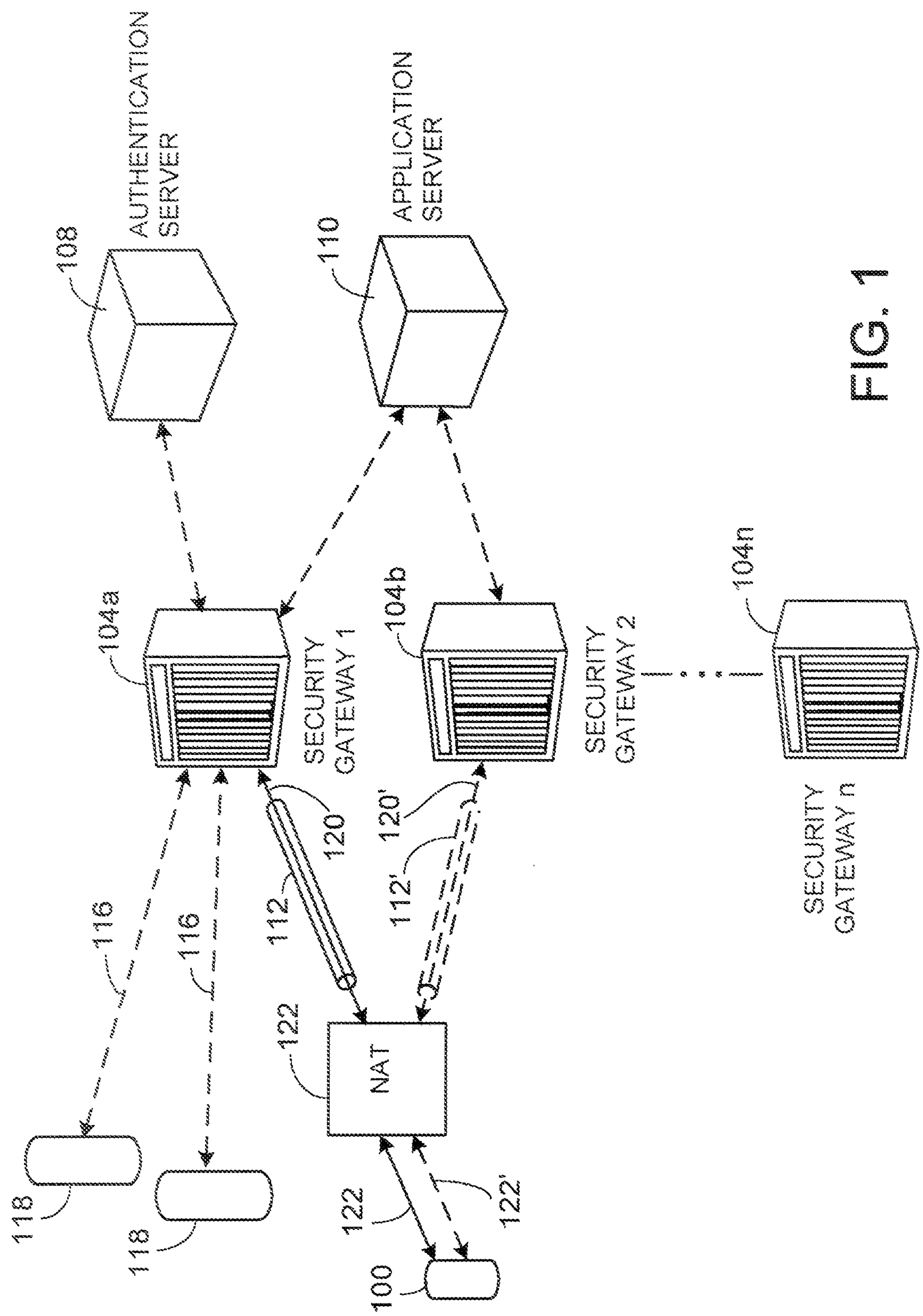
FIG. 1 is a diagram of access terminals and security gateways.

Referring to FIG. 1, an access terminal 100 accesses services provided by a service provider through one of a plurality of security gateways (e.g., 104*a*, 104*b*, . . . 104*n*, collectively referenced as 104). The security gateways 104 can authenticate the access terminal 100 and establish security associations that define parameters of a secure connection, e.g., a secure tunnel 112, with the access terminal 100. The access terminal 100 and the security gateways 104 follow a protocol to enable handoff of security associations from one security gateway (e.g., 104*a*) to another security gateway (e.g., 104*b*), effectively moving an end point of the secure tunnel 112 from one security gateway to another security gateway. This allows the access terminal 100 to have continuous support from the security gateways 104 as long as one of the security gateways 104 has sufficient resources to support the access terminal 100.

In some examples, the access terminal 100 may connect to the external network through a network address translator (NAT) 122. The access terminal 100 may exchange messages with, the first security gateway 104*a* to establish security associations according to IKEv2/IPSec protocol. An IPSec tunnel 112 may be established between the access terminal 100 and the first security gateway 104*a*.

A security association between the access terminal 100 and the security gateway 104*a* describes how the two devices will use security services (e.g., network encryption, integrity, and/or authenticity) to communicate securely. When the security service is determined, the two devices determine which algorithms to use (e.g., DES or 3DES for encryption; MD5 or SHA-1 for integrity). After deciding on the algorithms, the two devices share session keys. Each security association includes values of parameters such as a source/destination addresses/ports, a security parameter index (SPI), security keys, encryption algorithm and format, authentication algorithm, key lifetime, and additional attributes that define the secure tunnel 112. The information (referred to as "security information") related to the secure tunnel 112 is stored in a security parameter database in each of the access terminal 100 and the security gateway 104*a*.

When establishing the secure tunnel 112, the security server 104*a* may need to authenticate the access terminal 100. In some examples, account information such as network identifier codes (NAI) of the access terminals and associated passwords are stored centrally as an authentication server 108. The security gateway 104*a* communicates with the authentication server 108 in order to authenticate the access terminal 100. After the secure funnel 112 is established, the access terminal 100 can access services (e.g., e-mail, web browsing, local maps) provided by an application server 110, in which data packets transmitted between the access terminal 100 and the application server 110 pass through the security gateway 104*a*.

If no data is transferred between the access terminal 100 and the first, security gateway 104*a* for a predetermined period of time (e.g., when the access terminal 100 becomes idle or when the user is using the access terminal 100 without sending or receiving data packets), the communication session may enter a dormant state. In the dormant state, the access terminal 102 uses fewer resources of the first security gateway 104*a*. Later, when the access terminal 100 wants to send or receive packets, the session has to be moved from the dormant state to an active state, and the first security gateway 104 has to allocate more resources (e.g., memory and communication bandwidth) to support the session in the active state.

The first security gateway 104 has finite resources that can support a finite number of sessions in the active state. While the session with the access terminal 100 is dormant, the first security gateway 104*a* may have established security associations (e.g., 116) with several other devices (e.g., 118). When an attempt is made to move the session with the access terminal 100 from the dormant state to the active state, there may not be sufficient system resources in the first security gateway 104*a* to support the session in the active state. In this case, packets sent to or from the access terminal 100 may be dropped.

By following a protocol described below, the first security gateway 104*a* can transfer the security association to another security gateway (e.g., 104*b*) that, has sufficient resources to support a session in the active state with the access terminal 100, allowing the access terminal 100 to send or receive packets without interruption. When the first security gateway 104*a* receives an indication (e.g., a data packet sent to or received from the access terminal 100) that the session with the access terminal 100 will change to an active state, the first security gateway 104*a* determines whether it has sufficient resources to support the access terminal 100 in the active state. If the first security gateway 104*a* determines that it does not have sufficient resources, the first security gateway 104*s* queries other security gateways to find one that has sufficient resources.

For example, the second security gateway 104*b* responds to the first security gateway 104*a* that the second security gateway 104*b* has sufficient resources. The first security gateway 104*a* initiates handoff of security associations with the access terminal 100 to the second security gateway 104*b* by sending information about the security associations (e.g., information stored in the security parameter database) to the second security gateway 104*b* through a handoff tunnel between the first and second security gateways.

The second security gateway 104*b* confirms that it is ready to accept the handoff of the security associations. The first security gateway 104*a* sends a message to the access terminal 100 indicating that the security associations will transfer to anew internet protocol (IP) address. Upon receiving the message, the access terminal 100 sends a routing path validation request to the new IP address to test whether the new IP address (of the second security gateway 104*b*) is valid. The second security gateway 104*b* sends a response to the access terminal 100 to confirm that the routing path is valid. The second security gateway 104*b* informs the first security gateway 104*a* of success of the handoff. The first security gateway 104*a* releases resources associated with the security associations and pushes buffered data to the second security gateway 104*b*.

Thereafter, because the second security gateway 104*b* has received security information (including parameters of the security associations) from the first security gateway 104*a*, the second security gateway 104*b* can establish security associations with the access terminal 100 and perform security services (e.g., encryption and/or authentication). In effect, an end point 120 of the secure tunnel 112 has been transferred to the second security gateway 104*b*, and a secure tunnel 112' is established between the access terminal 100 and the second security gateway 104*b*, even though the access terminal 100 and the second security gateway 104*b* did not exchange messages (e.g., session keys) to establish security associations.

When sending messages to (or receiving messages from) the second security gateway 104*b*, the access terminal 100 encrypts (or decrypts) the messages using encryption keys (or decryption keys) and encryption (or decryption) algorithms previously used to encrypt (or decrypt) messages sent to (or received from) the first security gateway 104*a*. Similarly, when sending messages to (or receiving messages from) the access terminal 100, the second security gateway 104*b* encrypts (or decrypts) the messages using encryption keys (or decryption keys) and encryption (or decryption0 algorithms previously used by the first security gateway 104*a* to encrypt (or decrypt) messages sent to (or received from) the access terminal 100.

Here is a brief description of the NAT 122. When the access terminal 100 initially sends packets through the NAT 122 to establish, a communication link with the first security gateway 104*a*, the NAT 122 assigns a private address and a port number to the access terminal 100. The private address and the port number of the access terminal 100, and the IP address of the first security gateway 104*a*, are stored in a mapping table of the NAT 122. When the access terminal 100 sends a packet to the first security gateway 104*a*, the packet includes a source address that is the same as the public address of the NAT 122, and the port number associated with the access terminal 100. When the first security gateway 120 sends a packet to the access terminal 100, the packet includes a destination address that is the same as the public address of the NAT 122, and the port number associated with the access terminal 100. The NAT 122, upon receiving the packet from the first security gateway 104*a*, looks up the mapping table to find the private address of the access terminal 100 based on the port number, and forwards the packet to the access terminal 100.

The NAT 122 can be configured such that the NAT 122 may drop a packet intended for the access terminal 100 if the packet is from a source address that is unknown to the NAT 122. This is a safety measure that, protects the access terminal 100 from attacks launched from un-trusted sources.

In the process described above for transferring the end point 120 of the secure tunnel 112, after the second security gateway 104*b* receives information about the secure tunnel 112, the second security gateway 104*b* does not initiate contact with the access terminal 100. This is because the NAT 122 may not recognize the second security gateway 104*b* and may drop packets sent from the second security gateway 104*b*. Rather, the first security gateway 104*a* sends a message to the access terminal 100 in which the message includes the IP address of the second security gateway 104*b*, enabling the access terminal 100 to initiate contact with the second security gateway 104*b*. When the access terminal 100 sends a packet to the second security gateway 104*b*, the NAT 122 replaces the IP address of the first security gateway 104*a* with, the IP address of the second security gateway 104*b* in the mapping table. Later, when the NAT 122 receives packets from the second, security gateway 104*b*, the NAT 122 recognize the source address of the second security gateway 104*b*, and forwards the packet to the access terminal 100.

Figure 2:
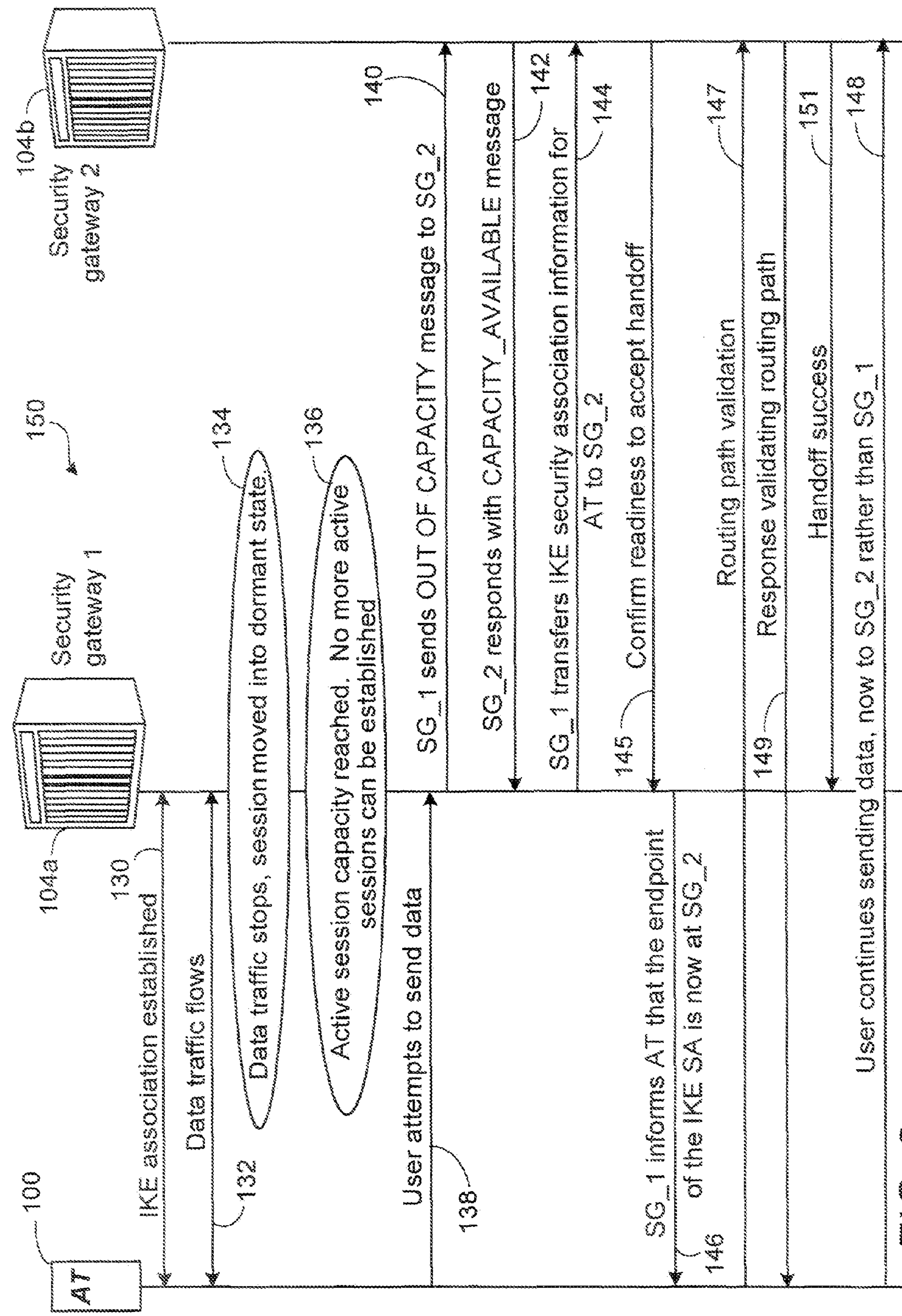
FIG. 2 is a diagram, of a message flow.

FIG. 2 shows an example of a message flow 150 for establishing the security associations between the access terminal 100 and the first security gateway 104*a*, and transferring the security associations from the first security gateway 104*a* to the second security gateway 104*b*.

Initially, the access terminal 100 and the first security gateway 104*a* exchange messages, including security keys, to establish 130 security associations. After the security associations are established, the access terminal 100 and the first security gateway 104*a* exchange 132 encrypted messages through a secure tunnel 112 defined by the parameters of the security associations. Data traffic between the access terminal 100 and the first security gateway 104 stops. After a predetermined period of inactivity, the session is moved to a dormant state. The security gateway 104*a* allocates few resources to maintain the security associations with the access terminal 100.

While the session with the access terminal 100 is in the dormant state, additional devices (e.g., 118) establishes 136 sessions in the active state with the security gateway 104*a*, such that the active session capacity of the first security gateway 104*a* is reached. Later, the user of the access terminal 100 attempts 138 to send data. The first security gateway 104*a* determines that it does not have sufficient resources to support a session in the active state with the access terminal 100. The first security gateway 104*a* sends 140 an "out of capacity" message to the other security gateways 104 in this example, the second security gateway 104*b* responds 142 with a "capacity available" message to the first security gateway 104*a*.

The first security gateway 104*a* transfers 144 security information about the security associations to the second security gateway 104*b* through a handoff tunnel. The second security gateway 104*b* sends 145 a message confirming that it is ready to accept the handoff. The first security gateway 104*a* informs 146 the access terminal 100 that the security associations will be transferred to the second security gateway 104*b*. The access terminal 100 sends 147 a routing path validation request to the second security gateway 104*b*. The second security gateway 104*b* returns 149 a response confirming validity of the routing path. The second security gateway 104*b* also sends 151 a message to the first security gateway 104*a* indicating handoff success. The access terminal 100 sends 148 data to the second security gateway 104*b* instead of the first security gateway 104*a*.

The exchange of messages in FIG. 2 between various devices can be achieved by using an extension to IKEv2, known as the Mobility and Multihoming Protocol (MOBIKE). The MOBIKE protocol is described in Internet Engineering Task Force (IETF) Request for Comments (RFC)

4555, June 2006, herein incorporated by reference. MOBIKE allows an initiator to update its IP address by sending an INFORMATIONAL request that includes an UPDATE_SA_ADDRESSES notification. The request is sent by the initiator through a new path using its new IP address. The initiator also starts to use the new IP address as a source address for its outgoing traffic. Upon receiving the UPDATE_SA_ADDRESSES notification, a responder records the new IP address and, if it is required by policy; performs a return routability check of the new IP address. When the check completes, the responder starts to use the new IP address as the destination address for its outgoing traffic. The MOBIKE protocol described in RFC 4555 is intended to provide mobility to the initiator, so that the initiator can keep the secure tunnel active while moving to a different location and acquiring a new IP address.

In RFC 4555, the UPDATE_SA_ADDRESSES notification indicates that a security association address (the IP address of the initiator) needs to be updated. The UPDATE_SA_ADDRESSES notification packet payload does not include the new IP address of the initiator. Because the initiator sends the notification using its new IP address, the responder knows the new IP address of the initiator based on the source address of the packet containing the notification, The message flow 150 can be implemented by using an extension to the MOBIKE protocol in which the INFORMATIONAL message can be sent in an existing path (e.g., between the access terminal 100 and the first security gateway 104*a*), and the UPDATE_SA_ADDRESSES notification includes a new IP address and port number. The new IP address and port number can be associated with the initiator or another device. When the responder receives the UPDATE_ SA_ADDRESSES notification, the responder uses the new IP address and port number as the destination address for future messages. The responder sends a return routability check to the new IP address and port number.

By using an extension to the MOBIKE protocol as described above, when two devices have established security associations, either one of the two devices can update its IP address and port number or transfer the security associations to a different device. If a device is updating its own IP address and port number, the UPDATE_SA_ADDRESSES notification can contain the new IP address and port number of the device. If the device Is transferring the security associations to another device, the UPDATE_SA_ADDRESSES notification can contain the IP address of the other device.

For example, in FIG. 2, the first security gateway 104*a* can inform 146 the access terminal 100 that the security associations will be transferred to the second security gateway 104*b* by sending an INFORMATIONAL request having an UPDATE_SA_ADDRESSES notification that includes the new IP address and port number of the second security gateway 104*b*. The hardware and/or software of the access terminal 100 and the security gateways 104 are configured so that they can recognize and process the new IP address and port number included in the UPDATE_SA_ADDRESSES notification.

Figure 3:
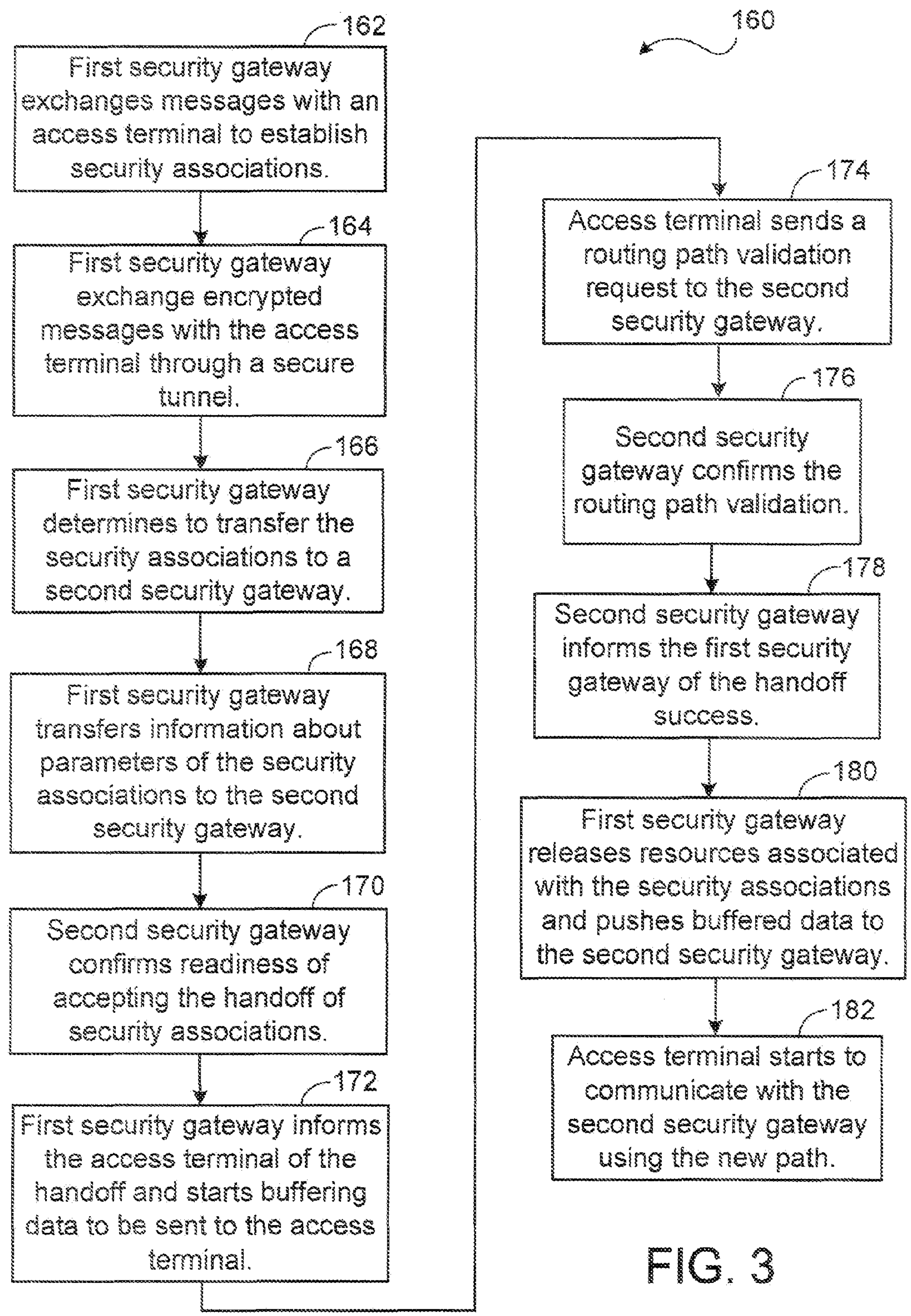
FIG. 3 is a flow diagram of a process.

FIG. 3 is a flow diagram of an example of a process 160 for a first security gateway (e.g., 104*a*) that has existing security associations established with an access terminal (e.g., 100) to transfer the security associations to another security gateway. In process 160, the first security gateway exchanges messages (including information about the encryption algorithm and encryption keys to be used) with the access terminal to establish 162 the security associations, and exchanges 164 encrypted messages with the access terminal through a secure tunnel (e.g., IPSec tunnel) using parameters defined by the security associations.

Later, the first security gateway determines 166 to transfer the security associations to a second security gateway (e.g., 104*b*). The first security gateway transfers 168 security information about the security associations to the second security gateway through a handoff funnel. The security information may include information about the IPSec tunnel context, including source/destination IP address/port information, SPI, current sequence number, agreed encryption/authentication proposal, lifetime, and so forth. The second security gateway checks to confirm that there is no SPI collision, so that the SPI of the security associations being transferred does not conflict with the SPIs of security associations already established between the second security gateway and other devices. In some examples, the first and second security gateways can have pre-agreed SPI scopes to avoid SPI collision. If a collision is detected, the handoff is stopped.

The second security gateway confirms 170 readiness of accepting the handoff of the security associations. The first security gateway informs 172 the access terminal of the handoff of security associations to the second security gateway. For example, the first security gateway may send an INFORMATIONAL request to the access terminal, in which the INFORMATIONAL request has an UPDATE_SA_ADDRESSES notification with an extended attribute that includes the IP address and port number of the second security gateway. The first security gateway starts buffering data to be sent to the access terminal, but continues to forward the data received from the access terminal (e.g., data to be sent to the application sever 110).

The access terminal validates 174 the new communication path with the second security gateway by performing a return routability check in response to the UPDATE_SA_ADDRESSES notification from the first security gateway. The second security gateway confirms 176 the routing path validation by sending a response to the access terminal. The second security gateway informs 178 the first security gateway of the handoff success. The first security gateway releases 180 resources associated with the security associations and pushes buffered data to the second security gateway. The access terminal then proceeds to communicate 182 with the second security gateway through the new path using the encryption algorithm and encryption keys previously established with the first security gateway.

Figure 4:
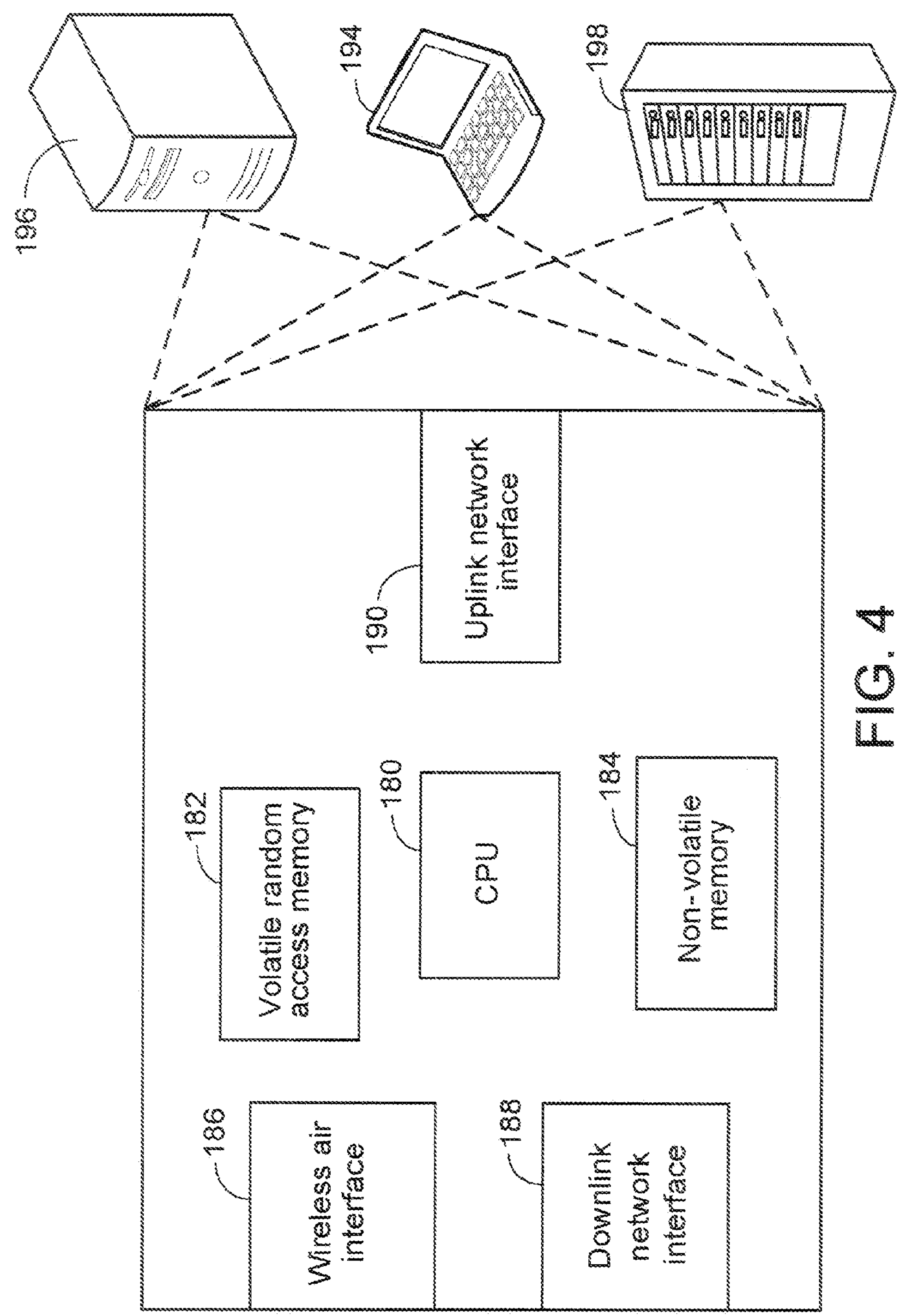
FIGS. 4 and 5 are schematic diagrams of computing devices.

FIG. 4 is a schematic diagram of an example of a computing device 192 that can be used to implement, e.g., the security gateway 104. The computing device 192 is intended to represent various forms of digital computers, such as laptops 194, desktops 196, workstations, servers, blade servers, mainframes, and other appropriate computers. The computing device 192 can be implemented by hardware or a combination of hardware and software. The components shown here, their connections and relationships, and their functions, are meant to be exemplary only, and are not meant to limit implementations of the Inventions described and/or claimed in this document, The computing device 192 includes a central processing unit (CPU) 180, a volatile random access memory 182, a non-volatile memory 184, a wireless air interface 186, a downlink network interface 188, and an uplink networking interface 190. Each of the components 180, 182,184, 186, 188, and 190 are interconnected using various buses, and may be mounted on a common motherboard or in other manners as appropriate. The CPU 180 can process instructions for execution, including instructions stored in the volatile random access memory 182 or the non-volatile memory 184. In other implementations, multiple processors maybe used, as appropriate, along with multiple memories and types of memory. Also, multiple computing devices 192 may be connected, with each device providing portions of the necessary operations (e.g., as a server bank, a group of blade servers, or a multi-processor system).

The non-volatile memory 184 stores software and configuration data, and can be, e.g., a hard disk drive, Hash memory, or other types of non-volatile storage. The non-volatile memory 184 can be configured to read data and instructions from a removable storage medium, such as a magnetic tape or optical disc.

The CPU 180 can process instructions for execution within the computing device 192, including instructions stored in the random access memory 182 or on the non-volatile memory 184. A computer program product can be tangibly embodied In an information carrier. The computer program product may also contain instructions that, when executed., perform one or more methods, such as those described above. The information carrier is a computer- or machine-readable medium, such as the volatile random, access memory 182, the non-volatile memory 184, memory on processor 180, or a propagated signal.

The computing device 192 can send (or receive) information to (or from), e.g., the authentication sever 108 or application server 110 through the uplink network interface 190. The computing device 192 can use the wireless air interface 186 to send (or receive) information to (or from) a wireless access terminal. The wireless air interface 186 includes, e.g., a radio frequency antenna, a radio module to send or receive radio signals, and a digital signal processor to process the radio signals. The radio module and the digital signal processor can be one integrated component or be built with discrete components. The security gateway 104 can use the downlink network interface 188 to communicate with a wired access terminal.

The computing device 192 may be implemented in a number of different forms, such as a standard server 196, a rack server system 198, or a personal computer such as a laptop computer 194.

Figure 5:
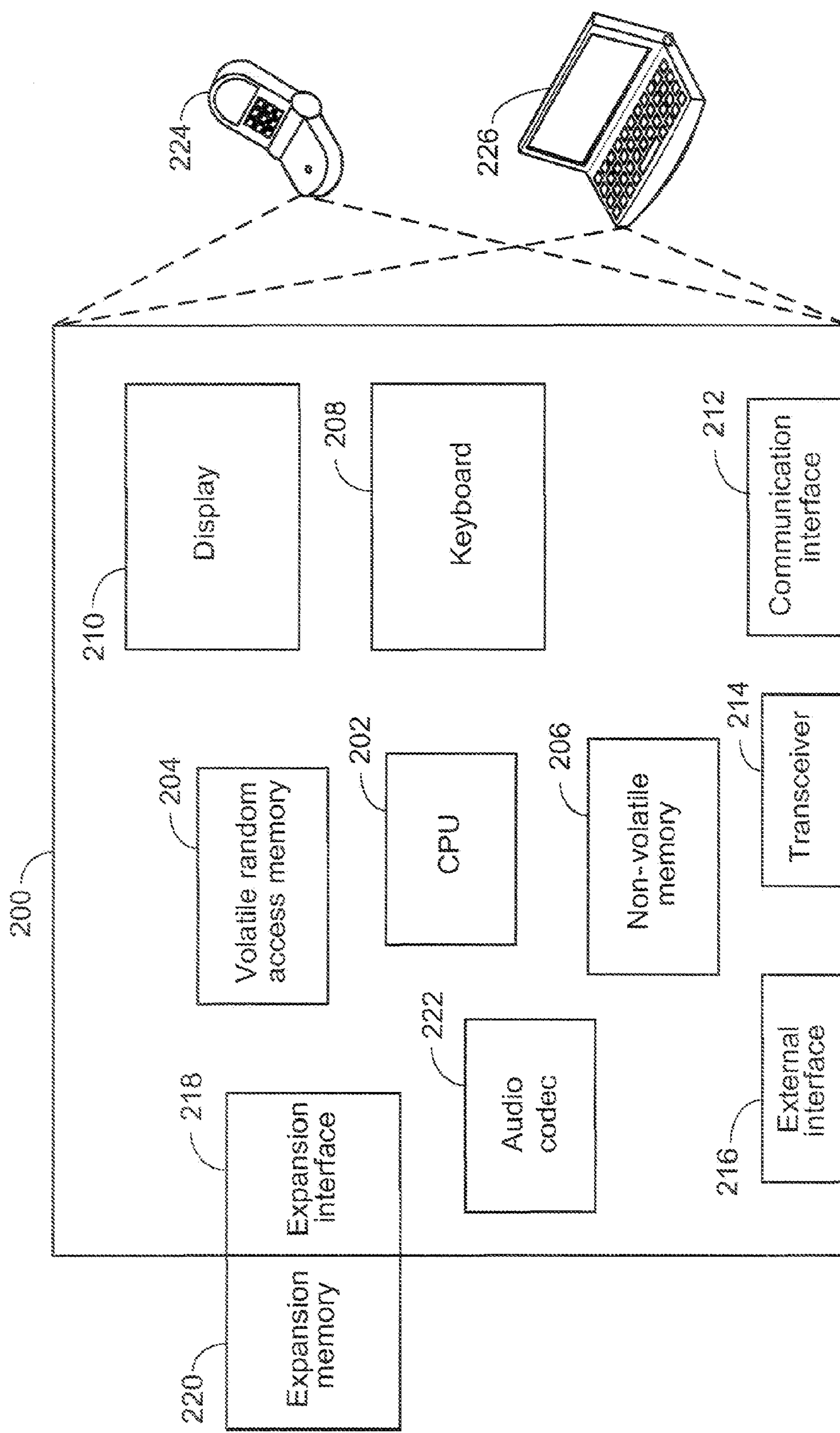

FIG. 5 is a schematic diagram of an example of a computing device 200 that can be used to implement a wireless access terminal 100. The computing device 200 can be, for example, a personal digital assistant, a cellular telephone, or a smartphone. The components shown here, their connections and relationships, and their functions, are meant, to be exemplary only, and are not meant to limit implementations of the inventions described and/or claimed in this document.

The computing device 200 includes a central processing unit (CPU) 202, volatile random access memory 204, non-volatile memory 206, an input device such as a keyboard 208 (or keypad), an output device such as a display 210, a communication interface 212, a transceiver 178, an external interface 216, and an expansion interface 218, among other components. The computing device 200 may also be provided with a storage device, such as a microdrive or other device, to provide additional storage. Each of the components 202, 204, 206, 208,210, 212, 214, 216, and 218, are interconnected using various buses, and several of the components may be mounted on a common motherboard or in other manners as appropriate.

The CPU 202 can execute instructions within the computing device 200, including Instructions stored in the volatile random access memory 204 and non-volatile memory 206. The CPU 202 may be implemented as a chipset of chips that, include separate and multiple analog and digital processors. The CPU 202 may provide, for example, coordination of the other components of the device 200, such as control of user interfaces, applications run by device 200, and wireless communication by device 200.

The keyboard 208 allows the user to enter commands, and the display 210 allows the device 200 to output information to the user. The display 210 may be, for example, a thin film transistor) liquid crystal display or an organic light emitting diode display; or other appropriate display technology. An external interface 216 may be provide to enable near area communication of the device 200 with other devices. The external interface 216 may provide, for example, for wired communication in some implementations, or for wireless communication in other implementations, and multiple interfaces may also be used.

The non-volatile memory 206 may include, for example, flash memory. Expansion memory 220 may also be provided and connected to the device 200 through the expansion interface 218, which may include, for example, a SIMM (Single In Line Memory Module) card interface. Such expansion memory 220 may provide extra storage space for the device 200, or may also store applications or other information for the device 200. The expansion memory 220 may include instructions to carry out or supplement the processes described above, and may include security information. For example, the expansion memory 220 may be provide as a security module for the device 200, and may be programmed with instructions that permit secure use of the device 200. In addition, security applications may be provided via the SIMM cards, along with, additional information, such as placing identifying information on the SIMM card in a non-hackable manner.

In one implementation, a computer program product is tangibly embodied in an information carrier. The computer program product contains instructions that, when executed, perform one or more methods, such as those described above. The information carrier is a computer- or machine-readable medium, such as the volatile random access memory 204, non-volatile memory 206, expansion memory 220, memory on the CPU 202, or a propagated signal that may be received, for example, over transceiver 214 or external interface 216.

Device 200 may communicate wirelessly through communication interface 212, which may include digital signal processing circuitry where necessary. Communication interface 212 may provide for communications under various modes or protocols. Such communication may occur, for example, through radio-frequency transceiver 214. In addition, short-range communication may occur, such as using a Bluetooth, WiFi, or other such transceiver (not shown).

Device 200 may communicate audibly using an audio codec 222, which may receive spoken information from the user and convert it to usable digital information. The audio codec 222 may generate audible sound for the user, such as through a speaker, e.g., in a handset of device 200.

The computing device 200 may be implemented in a number of different forms, as shown in the figure. For example, it may be implemented as a cellular telephone 224. It may also be implemented as part of a smartphone 226, personal digital assistant, or other similar mobile device.

Various implementations of the security gateway 104 and access terminal 100 and techniques described here can be realized in digital electronic circuitry, integrated, circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which maybe special or general purpose, coupled to receive data and instructions from, and to transmit data and instructions to, a storage system, and may have input and/or output devices.

The computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program, product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A number of embodiments of the invention have been described. Nevertheless, it will be understood that various modifications may be made without departing from the spirit and scope of the invention. For example, various forms of the message flow described above may be used, with steps reordered, added, or removed. The secure connection between the access terminal 100 and the security gateway 104 does not have to be a secure tunnel, and can be other types of secure connections. The access terminal 100 and the security gateways 104 can implement a subset of the MOBIKE protocol. The access terminal 100 and the security gateways 104 can comply with protocols other than those described above.

Handing off an end point of a secure connection across gateways is useful in situations other than when a session changes from a dormant state to an active state. Handing off an end point of a secure connection across gateways can also be useful for, e.g., load balancing or disaster processing. If the first security gateway has a heavy load while the second security gateway has a light load, the first security gateway can hand off the end points of some of the secure tunnels to the second gateway to balance the load. If the first security gateway detects hardware problems, the first security gateway can transfer the end points of one or more secure tunnels to the second security gateway so that services provided to the access terminals can continue without interruption. Other reasons for transferring existing security associations from one security gateway to another include, e.g., routing optimization and administrative roaming between operators.

In some examples, a "security gateway cluster farm" can be established to perform security functions by using a plurality of security gateways that are configured to transfer a first end point of a secure connection among the security gateways while a second end point of the secure connection is maintained at a client device. The transfer of the first end point of the secure connection among the security gateways can be performed for any of the purposes mentioned above, such as load balancing, using, e.g., the process 160 (FIG. 3) described above. Because the security associations can be transferred from one gateway to another, it Is not necessary to publish the addresses of all of the security gateways. Only the addresses of some (or one) of the security gateways in the security gateway cluster farm need to be published on the Domain Name System (DNS) to allow client devices to establish initial connection with the cluster farm.

Although several applications and methods have been described, it should be recognized that numerous other applications are contemplated. For example, the handoff of security associations can be from an access gateway to another access gateway, or from a server to another server, in which the access gateways and servers do not necessarily perform the functions of a security gateway. The access terminals, e.g., access terminal 100 can be implemented as a mobile device such as a cellular telephone, a wireless PDA, a handheld gaming device, or a wireless laptop computer, or a stationary device such as a desktop computer. In some examples, the UPDATE_SA_ADDRESSES notification, may include a new IP address without a port number.

For example, if there are multiple access terminals, a first access terminal can transfer the end point of a secure tunnel to a second access terminal. The feature may be useful in providing seamless transitions among the access terminals. For example, the user may be accessing a map service using a first cell phone with a small screen and a numeric keypad. The user decides to switch to a second cell phone with a larger screen and a full set of alphanumeric keys. Assumes that the first and second cell phones have IDs that are registered with the map service. Rather than using the second cell phone to dial in to the map service and navigate menus to reach the desired screen, the user initiates a handoff from the first cell phone to the second cell phone, so that after the handoff, the second cell phone shows the screen that the user was previously viewing, allowing the user to continue to access the map service without interruption.

The first and second cell phones may communicate with each other using, e.g., Bluetooth®. When the first cell phone wishes to transfer an end point of a secure tunnel to the second cell phone, the first cell phone sends information about the secure tunnel (e.g., IKEv2 security association information for the security gateway) to the second cell phone. The first cell phone also sends the second cell phone information about the sendee currently being accessed by the first cell phone. E.g., the first cell phone may send the URL of the map service and relevant cookies and/or passwords to the second cell phone. The first cell phone also acquires the IP address of the second cell phone. The first cell phone contacts the security gateway and sends an INFORMATIONAL request that includes an UPDATE _SA_ADDRESSES notification having the IP address and port number of the second cell phone. The security gateway sends a return routability checking message to the second cell phone. Afterwards, the second cell phone accesses the map service through the security gateway, communicating with the security gateway communicates using security parameters established between the first cell phone and the security gateway.

Handing-off an end point of a secure tunnel from a first mobile device to a second mobile device can be useful when the first mobile device determines that the battery is low. Under the user's control, the first mobile device can Initiate a handoff to a second mobile device so that the user can continue to access a service without interruption.

Accordingly, other embodiments are within the scope of the following claims.

What is claimed is:

1. A method comprising:

establishing a secure connection between a client device and a first security gateway, the first security gateway being associated with a service provider for providing a service to the client device;

while a communication session between the client device and the first security gateway is in a dormant state, receiving a signal indicating that the session will change from the dormant state to an active state; and at the first security gateway, handing off the secure connection to a second security gateway after determining that the second security gateway has more resources than the first security gateway to support the communication session in the active state, including sending from the first security gateway to the second security gateway security information used to encrypt and decrypt messages transmitted through the secure connection, and sending from the first security gateway to the client device an address of the second security gateway to enable the client device to initiate contact with the second security gateway.

2. The method of claim 1, further comprising transmitting encrypted messages between the client device and the second security gateway without exchanging security information between the client device and the second security gateway, the second security gateway encrypting and decrypting messages to and from the client device using the security information obtained from the first security gateway.

3. The method of claim 1, further comprising, at the first security gateway, buffering data intended to be sent to the client device, and not sending the buffered data from the first security gateway to the client device.

4. The method of claim 3, further comprising, upon receiving a message from the second security gateway indicating success of handoff of the secure connection, sending the buffered data from the first security gateway to the second security gateway.

5. The method of claim 3, further comprising, upon receiving a message from the second security gateway indicating success of handoff of the secure connection, releasing resources of the first security gateway that are associated with the secure connection.

6. The method of claim 1 wherein establishing the secure connection comprises using Internet Key Exchange (IKEv2) protocol to establish security associations.

7. The method of claim 6 wherein establishing the security associations comprises using IKEv2 Mobility and Multihoming (MOBIKE) protocol to establish the security associations.

8. The method of claim 7 wherein providing address information about the second security gateway comprises using an extension of the IKEv2 MOBIKE protocol by sending to the client device a message indicating that a security association address needs to be updated, and providing the address of the second security gateway in the message.

9. The method of claim 8 wherein the message comprises an INFORMATIONAL request containing an UPDATE_SA_ADDRESSES notification.

10. The method of claim 1 wherein establishing the secure connection comprises establishing a secure tunnel in which headers and payloads of packets transmitted in the secure tunnel are encrypted.

11. The method of claim 1 wherein providing the address of the second security gateway to the client device comprises providing an encrypted version of the address.

12. The method of claim 1, further comprising, at the second security gateway, receiving a return routability check issued by the client device.

13. The method of claim 1, further comprising sending from the second security gateway to the first security gateway a message confirming success of handoff of the secure connection.

14. The method of claim 1 wherein the client device comprises a mobile phone.

15. The method of claim 1, further comprising load balancing the first and second security gateways by handing off the secure connection from the first security gateway to the second security gateway.

16. A method comprising:

establishing security associations between a client device and a first security gateway that is associated with a service provider that provides service to the client device;

receiving, at the client device, a message from the first security gateway indicating that a security association address needs to be updated, the message including an address of a second security gateway, the updating of the security association address being initiated by the first security gateway and without being prompted by the client device, and at the client device, encrypting and decrypting messages transmitted to and received from the second security gateway without exchanging security keys with the second security gateway, the messages being encrypted or decrypted using security information previously used for encrypting or decrypting messages transmitted to or received from the first security gateway.

17. The method of claim 16, further comprising allowing a communication session between the client device and the first security gateway to enter a dormant state and later send data from the client device to the first security gateway.

18. The method of claim 16, further comprising, at the client device, upon receiving the message from the first security gateway, sending a return routability check message to the second security gateway using the address provided by the first security gateway.

19. A method comprising:

transferring a first end point of a secure tunnel from a first device to a second device by sending a first message from the first device to a third device, the third device located at a second end point of the secure tunnel, the message indicating that a security association address needs to be updated, the message including an address of the second device, the updating of the security association address being initiated by the first device and without being prompted by the third device, and sending a second message from the first device to the second device, the second message including security information used by the first device to encrypt and decrypt messages sent to and received from the third device through the secure tunnel.

20. The method of claim 19, further comprising establishing the secure tunnel using Internet Key Exchange (IKEv2) protocol.

21. The method of claim 20 wherein sending the first message comprises using an extension of IKEv2 Mobility and Multihoming (MOBIKE) protocol by sending the address of the second device in addition to an INFORMATIONAL request containing an UPDATE_SA_ADDRESSES notification.

22. The method of claim 19 wherein the first device comprises a client device and the third device comprises a security gateway associated with a service provider that provides service to the client device.

23. The method of claim 19 wherein the first and third devices each comprise a security gateway.

24. A method comprising:

transferring a first end point of a secure connection among a plurality of security gateways, the secure connection having a second end point that is maintained at a client device while the first end point is transferred among the plurality of security gateways, the transferring of the first end point among the plurality of security gateways being initiated by the security gateways and without being prompted by the client device, wherein transferring the first end point of the secure connection among the plurality of security gateways comprises transferring security information among the plurality of security gateways, the security information defining parameters of the secure connection.

25. The method of claim 24 wherein transferring the first end point of the secure connection among the security gateways comprises transferring the first end point from a first one of the security gateways to a second one of the security gateways, and sending from the first security gateway to the client device an address of the second security gateway to enable the client device to initiate contact with the second security gateway.

26. The method of claim 24, further comprising determining which one of the security gateways for accepting the transfer of the first end point of the secure connection to load balance the plurality of security gateways.

27. A system comprising:

a first security gateway configured to establish a secure connection with a client device by exchanging security keys with the client device, the first security gateway also configured to hand off the secure connection to a second security gateway by sending to the second security gateway security information used to encrypt and decrypt messages transmitted through the secure connection, and sending to the client device the address of the second security gateway to enable the client device to initiate contact with the second security gateway;

wherein the first security gateway is configured to initiate handoff of the secure connection upon (a) receiving a signal indicating that a communication session between the client device and the first security gateway will change from a dormant state to an active state and (b) determining that the first security gateway does not have enough resources to support the client device in the active state.

28. The system of claim 27, further comprising the second security gateway, wherein the second security gateway encrypts or decrypts messages sent to or received from the client device without exchanging security keys with the client device, the second security gateway encrypting or decrypting the messages sent to or received from the client device using the security information obtained from the first security gateway.

29. The system of claim 27 wherein the first security gateway is configured to initiate handoff of the secure connection upon determining that the first security gateway does not have enough resources to support the client device.

30. The system of claim 27 wherein the first security gateway is configured to initiate handoff of the secure connection upon determining that the second security gateway has more resources than the first security gateway to support the client device.

31. The system of claim 27 wherein the first security gateway is configured to buffer data intended to be sent to the client device after the start of the handoff of the secure connection, and not send the buffered data from the first security gateway to the client device.

32. The system of claim 31 wherein the first security gateway is configured to send the buffered data from the first security gateway to the second security gateway upon receiving a message from the second security gateway indicating success of handoff of the secure connection.

33. The system of claim 31 wherein the first security gateway is configured to release resources that are associated with the secure connection upon receiving a message from the second security gateway indicating success of handoff of the secure connection.

34. The system of claim 27 wherein the first security gateway is configured to establish secure associations with the client device using Internet Key Exchange (IKEv2) protocol.

35. The system of claim 34 wherein the first security gateway is configured to modify the security associations with the client device using IKEv2 Mobility and Multihoming (MOBIKE) protocol.

36. The system of claim 35 wherein the first security gateway is configured to provide the address of the second security gateway to the client device using an extension of the IKEv2 MOBIKE protocol by sending to the client device a message indicating that a security association address needs to be updated, and providing the address of the second security gateway in the message.

37. The system of claim 27 wherein the secure connection comprises a secure tunnel in which headers and payloads of packets transmitted in the tunnel are encrypted.

38. The system of claim 27 wherein the first security gateway is configured to provide an encrypted version of the address of the second security gateway to the client device.

39. The system of claim 27 wherein the client device comprises a mobile phone.

40. A system comprising:

a client device configured to establish security associations with a first security gateway by exchanging security keys with the first security gateway, the client device receiving service from a service provider associated with the first security gateway, wherein the client device is configured to recognize a message from the first security gateway indicating that a security association address needs to be updated, the message including an address of a second security gateway, the updating of the security association address being initiated by the first security gateway and without being prompted by the client device, and the client device is also configured to send encrypted messages to the second security gateway using the address included in the message, the client device encrypting the messages using security information previously used to encrypt messages sent to the first security gateway.

41. The system of claim 40 wherein the client device is configured to send a return routability check message to the second security gateway upon receiving the message from the first security gateway.

42. The system of claim 40 wherein the client device comprises a mobile phone.

43. The system of claim 40 wherein the client device is configured to establish the security associations with the first security gateway using Internet Key Exchange (IKEv2) protocol.

44. The system of claim 40 wherein the client device is configured to establish the security associations with the first security gateway using IKEv2 Mobility and Multihoming (MOBIKE) protocol.

45. The system of claim 44 wherein the message from the first security gateway comprises an INFORMATIONAL request containing an UPDATE_SA_ADDRESSES notification.

46. A system comprising:

a plurality of security gateways that are configured to transfer a first end point of a secure connection among the plurality of security gateways, the secure connection having a second end point that is maintained at a client device while the first end point is transferred among the plurality of security gateways, the transferring of the first end point among the plurality of security gateways being initiated by the security gateways and without being prompted by the client device, wherein the plurality of security gateways are configured to transfer security information associated with the secure connection from a first one of the plurality of the security gateways to a second one of the plurality of security gateways when transferring the first end point of the secure connection from the first security gateway to the second security gateway.

47. The system of claim 46 wherein the plurality of security gateways are configured such that when transferring the first end point from a first one of the plurality of security gateways to a second one of the plurality of gateways, the first security gateway sends to the client device an address of the second security gateway to enable the client device to initiate contact with the second security gateway.

48. The system of claim 46 wherein the plurality of security gateways are configured such that a first one of the security gateways establish the secure connection with the client device by exchanging messages with the client device to establish security associations that define parameters of the secure connection according to IKEv2 protocol.

49. The system of claim 46 wherein the plurality of security gateways are configured to transfer the first end point of the secure connection among the plurality of security gateways for load balancing.

* * * * *